(12) United States Patent  
Koch et al.

(10) Patent No.: US 6,516,673 B2  
(45) Date of Patent: Feb. 11, 2003

(54) DEVICE TO ENCAPSULATE A PRESSURE SENSOR

(75) Inventors: Russell W. Koch, Hartville, OH (US); Walter Tomaszewski, Canton, OH (US); David A. Weitzenhof, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/943,915

(22) Filed: Aug. 31, 2001

(65) Prior Publication Data

US 2002/0029628 A1 Mar. 14, 2002

Related U.S. Application Data

(62) Division of application No. 09/680,639, filed on Oct. 6, 2000, which is a division of application No. 09/174,438, filed on Oct. 16, 1998, now Pat. No. 6,161,430.

(51) Int. Cl.⁷ ................................................ G01L 7/00
(52) U.S. Cl. ....................................................... 73/756
(58) Field of Search .............................. 73/146, 146.5, 73/8, 9, 756; 152/64, 123, 152.1, 151, 367, 539, 540, 543–547

(56) References Cited

U.S. PATENT DOCUMENTS

| | | | | |
|---|---|---|---|---|
| 5,562,787 A | * | 10/1996 | Koch et al. | 156/64 |
| 5,573,610 A | * | 11/1996 | Koch et al. | 152/152.1 |
| 5,960,844 A | * | 10/1999 | Hamaya | 152/152.1 |
| 6,082,191 A | * | 7/2000 | Neiferd et al. | 73/146 |
| 6,161,430 A | * | 12/2000 | Koch et al. | 73/146 |
| 6,386,254 B1 | * | 5/2002 | Koch et al. | 152/216 |

* cited by examiner

*Primary Examiner*—William Oen  
(74) *Attorney, Agent, or Firm*—John M. Vasuta; Mike Sand

(57) ABSTRACT

A device for encapsulating a monitoring device for a pneumatic tire with an encapsulation material includes an encapsulation body having an encapsulation chamber. The monitoring device has at least a pressure sensor and an antenna. A damming element is carried by the encapsulation body in an adjustable manner such that the damming element prevents the pressure sensor from being clogged with the encapsulating material when the monitoring device is encapsulated.

17 Claims, 5 Drawing Sheets

DEVICE TO ENCAPSULATE A PRESSURE SENSOR

CROSS REFERENCE TO RELATED APPLICATIONS

This application is a divisional application of U.S. patent application Ser. No. 09/680,639 filed Oct. 6, 2000, which is a division Ser. No. 09/174,438 filed Oct. 16, 1998 of U.S. Pat. No. 6,161,430; the disclosures of both are incorporated herein by reference.

BACKGROUND OF THE INVENTION

1. Technical Field

The present invention generally relates to an encapsulation device and, more particularly, to an encapsulation device that is used to encapsulate a monitoring device typically used on the inner surface of a pneumatic tire to monitor tire conditions while the tire is mounted on a vehicle. Specifically, the present invention is related to a device for encapsulating an electronic monitoring device in a protective housing while allowing the pressure sensor of the monitoring device to remain in fluid communication with the surrounding atmosphere so that it may function.

2. Background Information

It is often desired in the art to monitor the conditions of a tire while it is installed and in use on a vehicle. Typical desirable measurements are tire wear, internal temperature, and internal pressure. These measurements are preferably taken while the tire is in use on a vehicle without having to remove the tire from the vehicle or specially position the tire to take the measurement. Numerous types of monitoring devices are known in the art to perform these measurements. One type of known monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,573,610, 5,562,787, and 5,573,611 which are assigned to the assignee of the present application.

One of the problems in the art with these monitoring devices is that they are relatively fragile when compared to the harsh environment of a pneumatic vehicle tire. The forces experienced by a pneumatic tire are sufficient to break the fragile electronic monitoring device and render it unusable. These forces include rotational forces caused by the rotation of the tire and shock forces caused by the tire impacting articles on the ground. It is thus necessary to provide the monitoring device with some protection from these forces. One manner of protecting the sensitive electronic monitoring device is to encapsulate the device in a relatively rigid material such as a hardened epoxy or plastic. The encapsulation material holds the elements of the electronic monitoring device in position with respect to each other and prevents the electronic monitoring device from tearing apart when subjected to the tire forces.

A problem with encapsulating the monitoring device is that the monitoring device preferably includes a pressure sensor that must remain in fluid communication with the internal cavity of the tire so that the pressure sensor may sense the internal pressure of the tire. The required fluid communication thus dictates that the entire electronic monitoring device cannot be encapsulated and that a breathing hole must be provided either during encapsulation or formed after encapsulation. Forming the breathing hole after encapsulation is generally not desired given the difficulty of precisely locating the hole, cleaning the pressure sensor, and the expense of the additional step in the encapsulation process. It is thus desired in the art to provide an encapsulation device that allows a monitoring device having a pressure sensor to be encapsulated while maintaining fluid communication between the pressure sensor and the surrounding atmosphere.

Another problem encountered with encapsulating an electronic monitoring device is that the monitoring device must be entirely encapsulated in preferably a single step. The monitoring device thus must float within the encapsulation chamber so that the encapsulation material may completely surround the encapsulation device. It is thus desired in the art to provide an encapsulation device that holds the monitoring device in a manner so that it may be entirely encapsulated in a single step.

SUMMARY OF THE INVENTION

In view of the foregoing, it is an objective of the present invention to provide a device for encapsulating an electronic monitoring device that is used in a pneumatic tire.

Another objective of the present invention is to provide a device for encapsulating a monitoring device that has a pressure sensor that must remain in fluid communication with the surrounding atmosphere after the device has been encapsulated so that the pressure sensor may sense the pressure in the pneumatic tire.

A further objective of the present invention is to provide an encapsulating device for a sensitive monitoring device for a pneumatic tire that allows the entire device to be surrounded by the encapsulation material in a single encapsulation step.

Another objective of the present invention is to provide a device for encapsulating an electronic monitoring device for a pneumatic tire that creates a textured surface on the bottom of the encapsulated device to aid in the adhesion of the encapsulated device to the tire.

A further objective of the present invention is to provide a device for encapsulating a monitoring device for a pneumatic tire that indicates when the encapsulation material has filled the encapsulation chamber signifying that the monitoring device has been entirely encapsulated.

Another objective of the present invention is to provide a device for encapsulating a monitoring device for a pneumatic tire that includes a breathing tube that prevents the encapsulation material from clogging the pressure sensor when the encapsulation material has completely filled the encapsulation chamber.

Another objective of the present invention is to provide a device for encapsulating a monitoring device for a pneumatic tire wherein the antenna of the monitoring device is used to suspend the monitoring device in a floating disposition within the encapsulation chamber.

A further objective of the present invention is to provide a device for encapsulating a monitoring device that is of simple construction, that achieves the stated objectives in a simple, effective, and inexpensive manner, that solves the problems, and that satisfies the needs existing in the art.

These and other objectives and advantages of the present invention are obtained by a device for encapsulating a monitoring device for a pneumatic tire with an encapsulation material, the monitoring device having at least a pressure sensor, the device for encapsulating including an encapsulation body having an encapsulation chamber; and a damming element carried by the encapsulation body, the damming element being adapted to engage at least a portion of the pressure sensor to prevent the encapsulation material from clogging the pressure sensor.

Other objectives and advantages of the present invention are obtained by the combination of a monitoring device to be encapsulated and a device for encapsulating the monitoring device with an encapsulation material, the monitoring device including a pressure sensor and an antenna carried on a substrate, the encapsulating device including an encapsulation body having an encapsulation chamber, and a damming element carried by the encapsulation body, the monitoring device disposed in the encapsulation chamber, the damming element engaging the pressure sensor to prevent the encapsulation material from clogging the pressure sensor.

BRIEF DESCRIPTION OF THE DRAWINGS

The preferred embodiment of the invention, illustrative of the best mode in which applicants contemplate applying the principles of the invention, is set forth in the following description and is shown in the drawings and is particularly and distinctly pointed out and set forth in the appended claims.

Similar numbers refer to similar element throughout the specification.

DESCRIPTION OF THE PREFERRED EMBODIMENT

Figure 1:
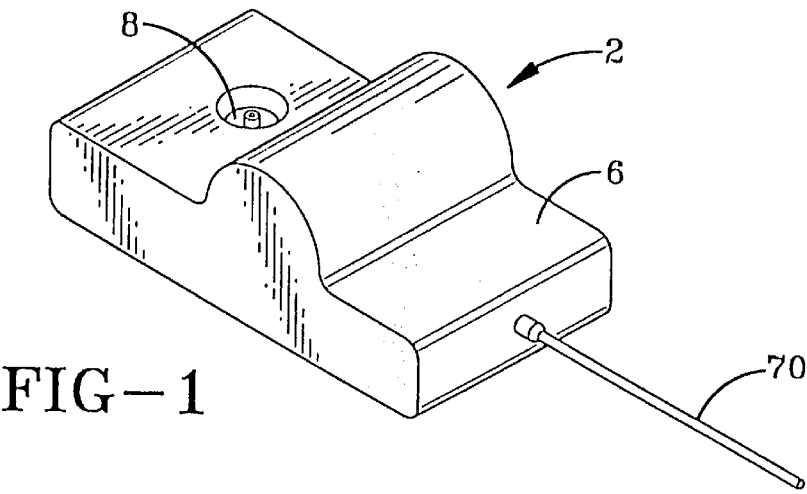
FIG. 1 is a perspective view of an encapsulated monitoring device that was encapsulated in the device of the present invention.
Figure 2:
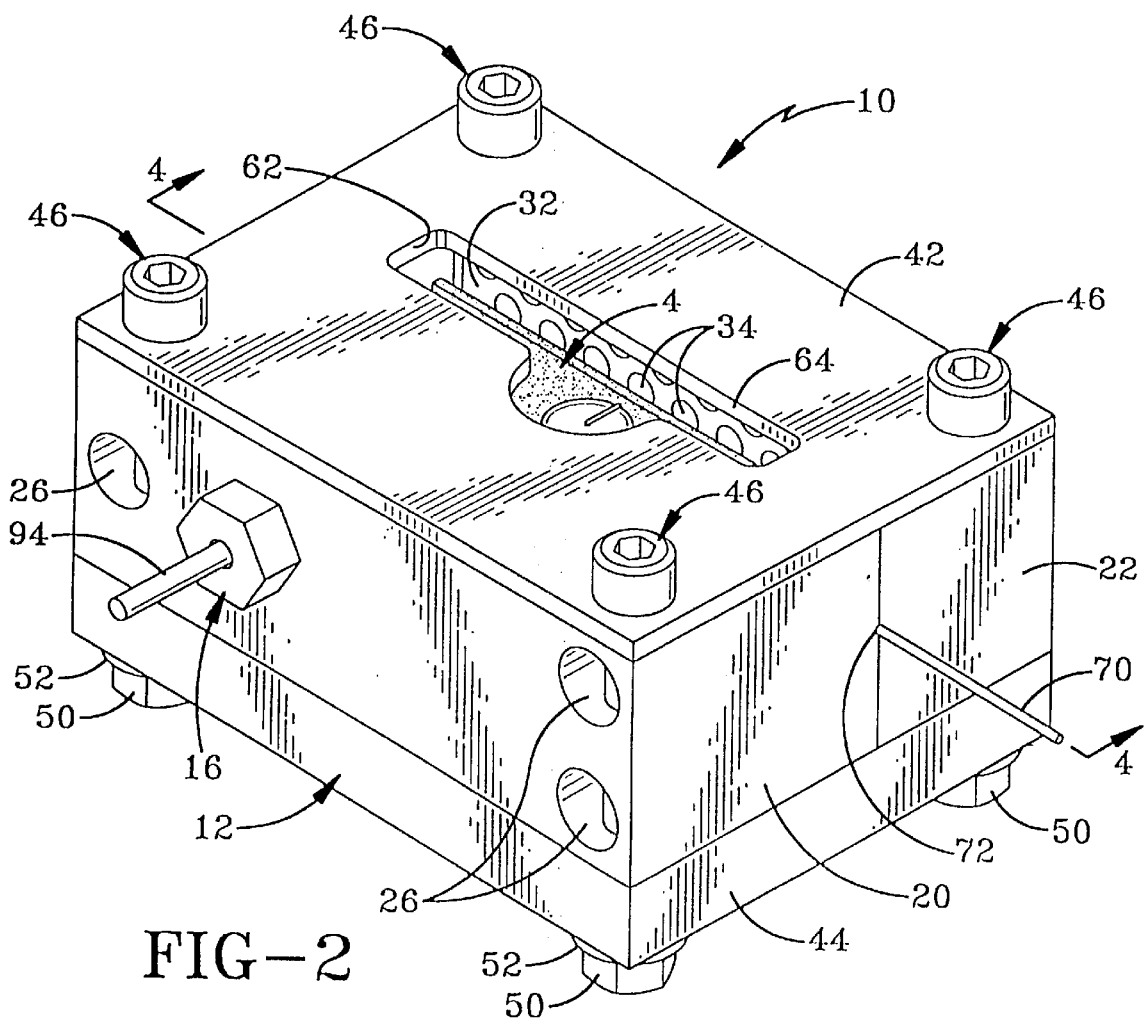
FIG. 2 is a perspective view of the device to encapsulate a substrate containing sensitive electronic components and a pressure sensor pack.
Figure 3:
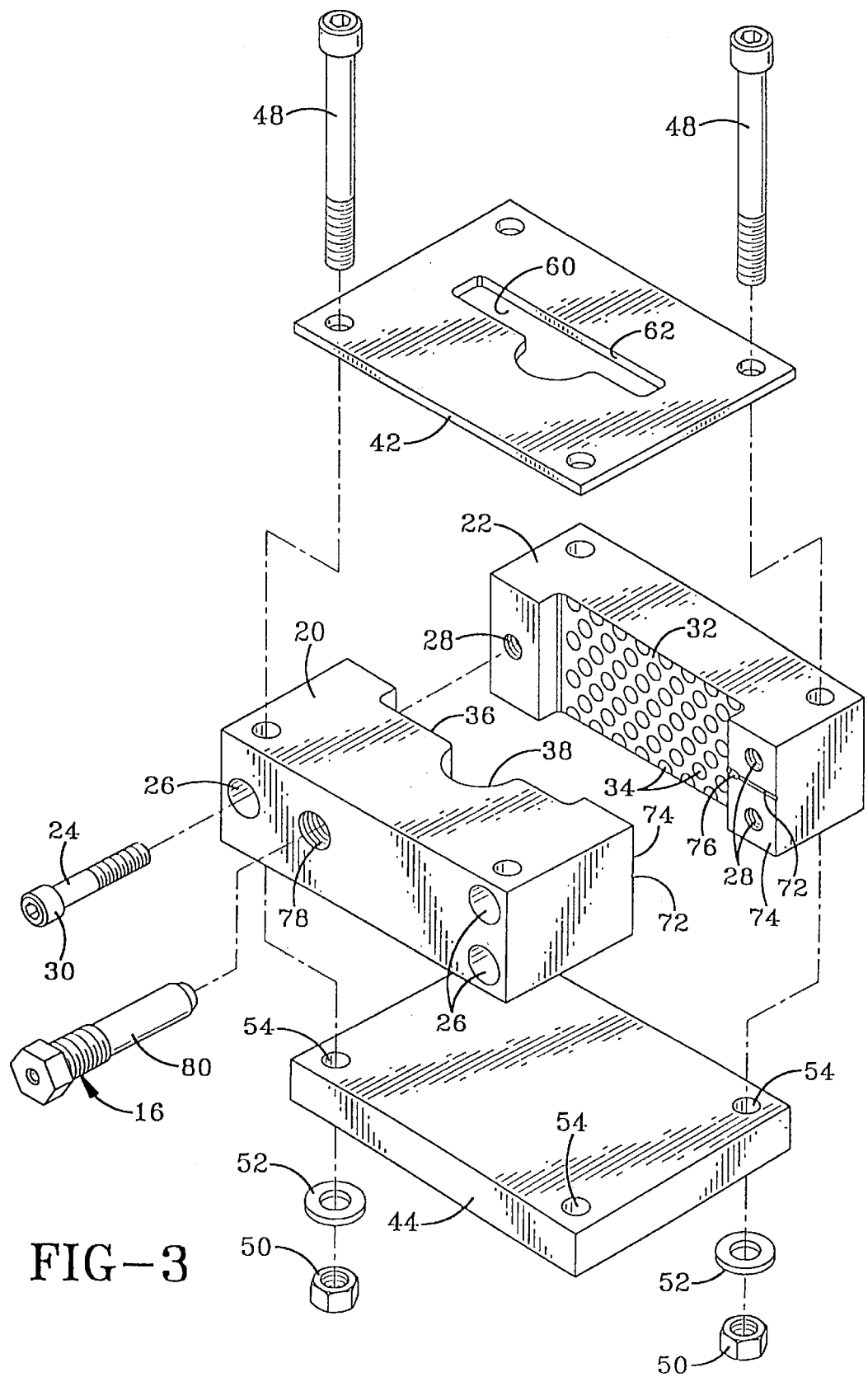
FIG. 3 is an exploded perspective view of the encapsulating device of the present invention shown in FIG. 2.

An encapsulated monitoring device used to monitor pneumatic tires is depicted in FIG. 1 and is indicated generally by the numeral 2. Encapsulated monitoring device 2 includes a monitoring device 4 that has been encapsulated is in an encapsulation material 6. Encapsulation material 6 creates a protective housing for monitoring device 4 that prevents monitoring device 4 from breaking when subjected to the forces experienced by a pneumatic tire. Encapsulation material 6 may be an epoxy that is substantially rigid when it cures or a suitable plastic. It is desired in the art for encapsulation material 6 to completely surround monitoring device 4 so that monitoring device 4 is completely protected while in use. A problem occurs with encapsulating the entire monitoring device 4 when monitoring device 4 includes a pressure sensor 8 that must remain in fluid communication with the interior chamber of a pneumatic tire for the pressure sensor to function.

In accordance with one of the objectives of the present invention, a device for encapsulating monitoring device 4 with encapsulation material 6 is depicted in the drawings and is indicated generally by the numeral 10. Encapsulating device 10 is adapted to entirely encapsulate monitoring device 4 while allowing pressure sensor 8 of monitoring device 4 to remain in fluid communication with the atmosphere surrounding encapsulated monitoring device 2. Encapsulating device 10 generally includes an encapsulation body 12 that has an encapsulation chamber 14 disposed in body 12. Encapsulation chamber 14 is configured to receive monitoring device 4 in a floating arrangement such that device 4 is substantially centered in encapsulation chamber 14 when it is received therein. The embodiment of the invention described here and depicted in the drawings is shown for encapsulating a specific embodiment of monitoring device 4 that has an overall rectangular shape with a cylindrical bulge protruding from one side of the rectangle. It is understood that the concepts of the present invention may be adapted to function with monitoring devices having different configurations and shapes than monitoring device 4 depicted in these drawings. Encapsulating device 10 also includes a damming element 16 that is carried by encapsulation body 12 where it contacts monitoring device 4 at pressure sensor 8 to support monitoring device 4 within encapsulation chamber 14 and to prevent pressure sensor 8 from becoming clogged when encapsulation chamber 14 is filled with encapsulation material 6. Encapsulating device 10 is used by placing monitoring device 4 in encapsulation chamber 14 in a floating arrangement that allows encapsulation material 6 to surround most of monitoring device 4. Encapsulation material 6 is then poured into or otherwise introduced into encapsulation chamber 14 to surround monitoring device 4. Encapsulation material 6 is then permitted to cure or dry to form encapsulated monitoring device 2 depicted in FIG. 1.

Encapsulation body 12 includes a first body half 20 and a second body half 22 that cooperate to form encapsulation chamber 14 when halves 20 and 22 are connected. Body halves 20 and 22 may be connected by a plurality of connectors 24 such as the bolts depicted in the drawings. Each connector 24 is received in a hole 26 in first body half 20 and a threaded hole 28 in second body half 22. In the embodiment of the invention depicted in the drawings, three connectors 24 are used to hold body halves 20 and 22 together. In other embodiments of the invention, different numbers of connectors 24 may be used and different types of connectors may hold body halves 20 and 22 together. Each hole 26 includes a shoulder 27 that engages the head 30 of connector 24 to create the clamping force between connector 24 and body halves 20 and 22.

In accordance with one of the objectives of the present invention, second body half 22 includes a textured surface 32 that forms a portion of encapsulation chamber 14 when body halves 20 and 22 are connected. In the embodiment of the invention depicted in the drawings, textured surface 32 includes a plurality of dimples 34 that are concave with respect to encapsulation chamber 14. Each dimple 34 is filled with encapsulation material 6 to form a textured surface on encapsulated monitoring device 2 that improves the ability of encapsulated monitoring device 2 to adhere to surfaces such as the innerliner of a pneumatic tire. Other textured surfaces 32 may also be used instead of dimples 34 that simply provide an exemplary embodiment of the present invention.

First body half 20 includes a chamber wall 36 that defines another portion of encapsulation chamber 14 when halves 20 and 22 are connected. Chamber wall 36 includes a battery portion 38 that extends into first body half 20 to accommodate the battery 40 of monitoring device 4.

Although first and second body halves 20 and 22 may be configured to completely form encapsulation chamber 14 when they are connected, the preferred embodiment of the present invention uses a top plate 42 and a bottom plate 44 to complete encapsulation chamber 14 and to hold body halves 20 and 22 together. Body halves 20 and 22 are sandwiched between top plate 42 and bottom plate 44. A plurality of connectors 46 connect elements 42, 20, 22, and 44 in a manner that is known in the art. For instance, each connector 46 may include a bolt 48 that is configured to extend entirely through top plate 42, a body half 20 or 22, and bottom plate 44 where a nut 50 threadably engages the threaded end of bolt 48. A washer 52 may further be used between nut 50 and bottom plate 44. In other embodiments of the present invention, the bore 54 and bottom plate 44 may be threaded to threadably receive bolt 48.

Figure 9:
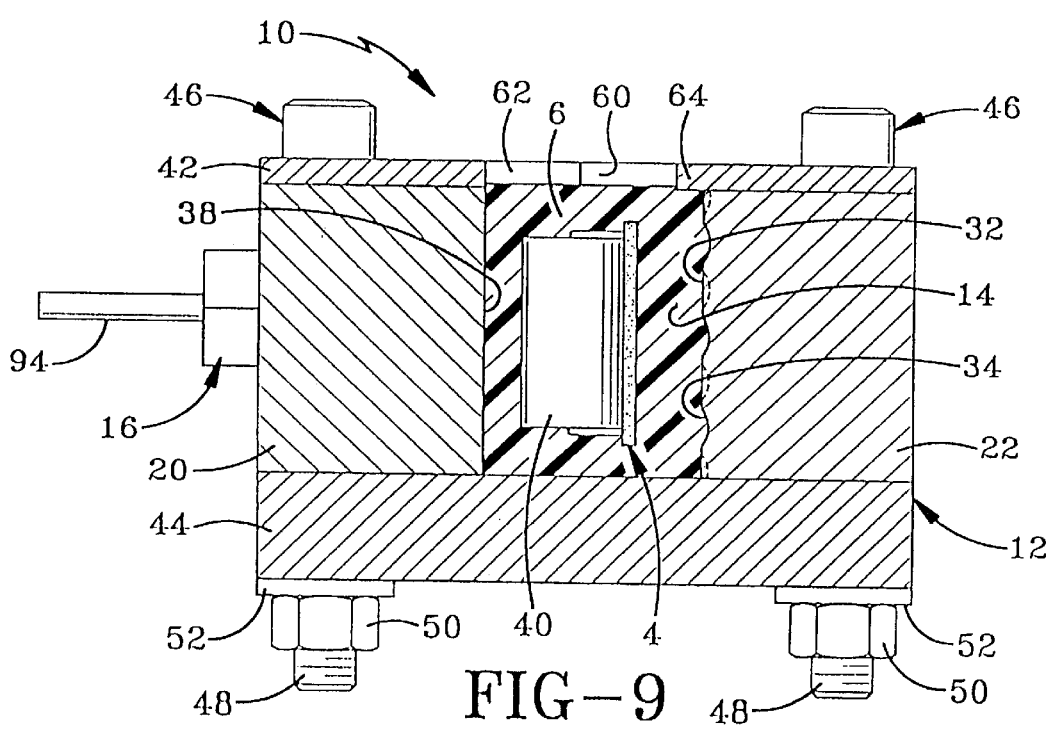
FIG. 9 is a sectional view taken along line 9—9 of FIG. 7.

In accordance with another objective of the present invention, top plate 42 has an opening 60 that substantially matches the contours of encapsulation chamber 14. Opening 60 forms an edge 62 in top plate 42. As best seen in FIG. 9, edge 62 is substantially flush with encapsulation wall 36 and battery portion 38 while extending over a portion of encapsulation chamber 14 to form a lip 64. Lip 64 serves an indicator that tells a person filling encapsulation chamber 14 with encapsulation material 6 that encapsulation chamber 14 is completely filled. The person filling encapsulation chamber 14 thus stops adding encapsulation material 6 to encapsulation chamber 14 when material 6 reaches lip 64. In automated applications, a sensor may be disposed at lip 64 to indicate when encapsulation chamber 14 has been filled. In the exemplary embodiment of the present invention, lip 64 extends only along one side of encapsulation chamber 14. It is also contemplated that lip 64 may extend entirely about encapsulation chamber 14 or merely over another small portion of encapsulation chamber 14 different from the bottom edge depicted in the drawings.

In accordance with another objective of the present invention, body halves 20 and 22 cooperate to hold monitoring device 4 in a floating disposition within encapsulation chamber 14. The floating disposition allows monitoring device 4 to be entirely surrounded by encapsulation material 6. One of the manners of supporting monitoring device 4 in this floating disposition is to support the antenna 70 of monitoring device 4 in a channel 72 disposed in body 12. In the preferred embodiment of the present invention, channel 72 is formed in one or both of mating surfaces 74 of body halves 20 and 22 so that monitoring device 4 may be placed in encapsulation chamber 14 as body halves 20 and 22 are being put together to clamp antenna 70 between body halves 20 and 22. In the preferred embodiment, channel 72 is partially formed in each body half 20 and 22. Channel 72 includes a wide area 76 adjacent encapsulation chamber 14 that allows encapsulation material 6 to surround a portion of antenna 70 to provide strength to antenna 70 to help prevent it from breaking off.

Figure 4:
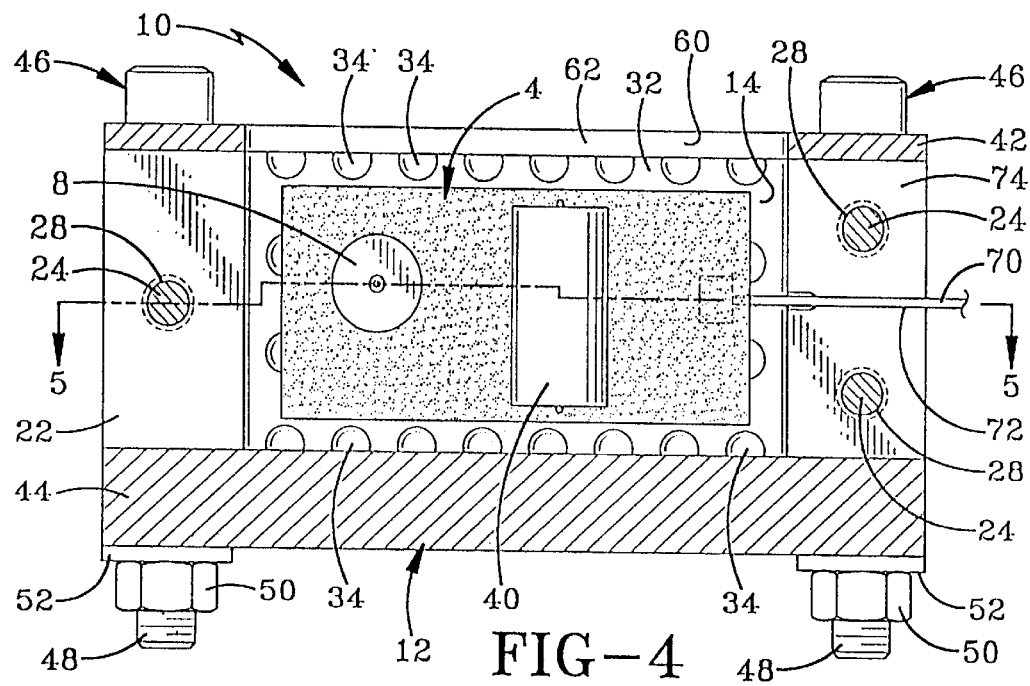
FIG. 4 is a sectional view taken along line 4—4 of FIG. 2.
Figure 5:
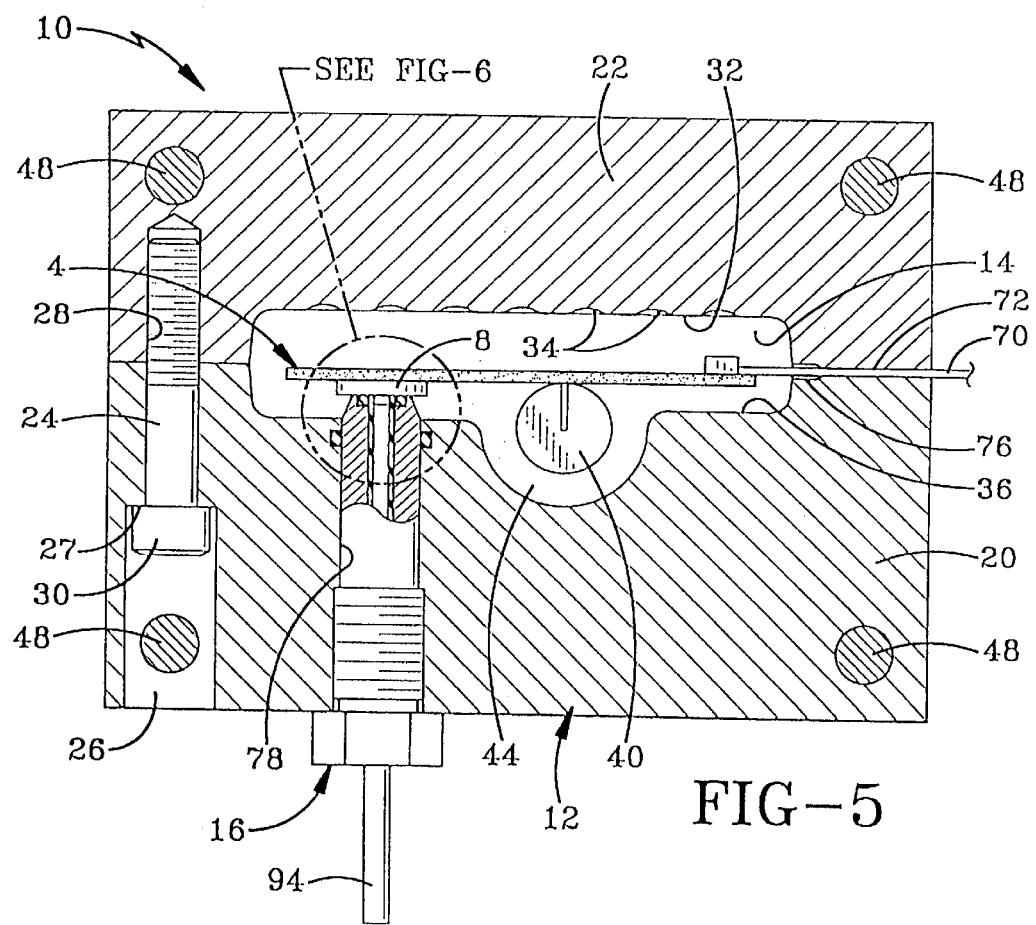
FIG. 5 is a sectional view taken along line 5—5 of FIG. 4.
Figure 6:
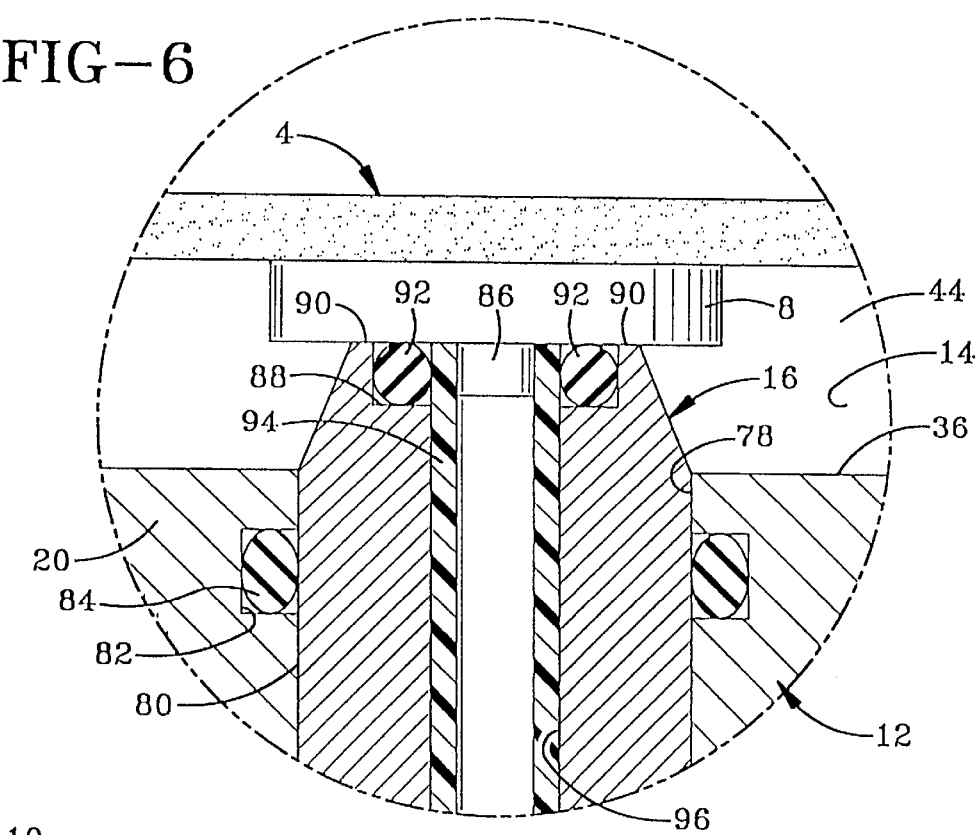
FIG. 6 is an enlarged view of the portion encircled by the circle labeled with FIG. 6 in FIG. 5.
Figure 7:
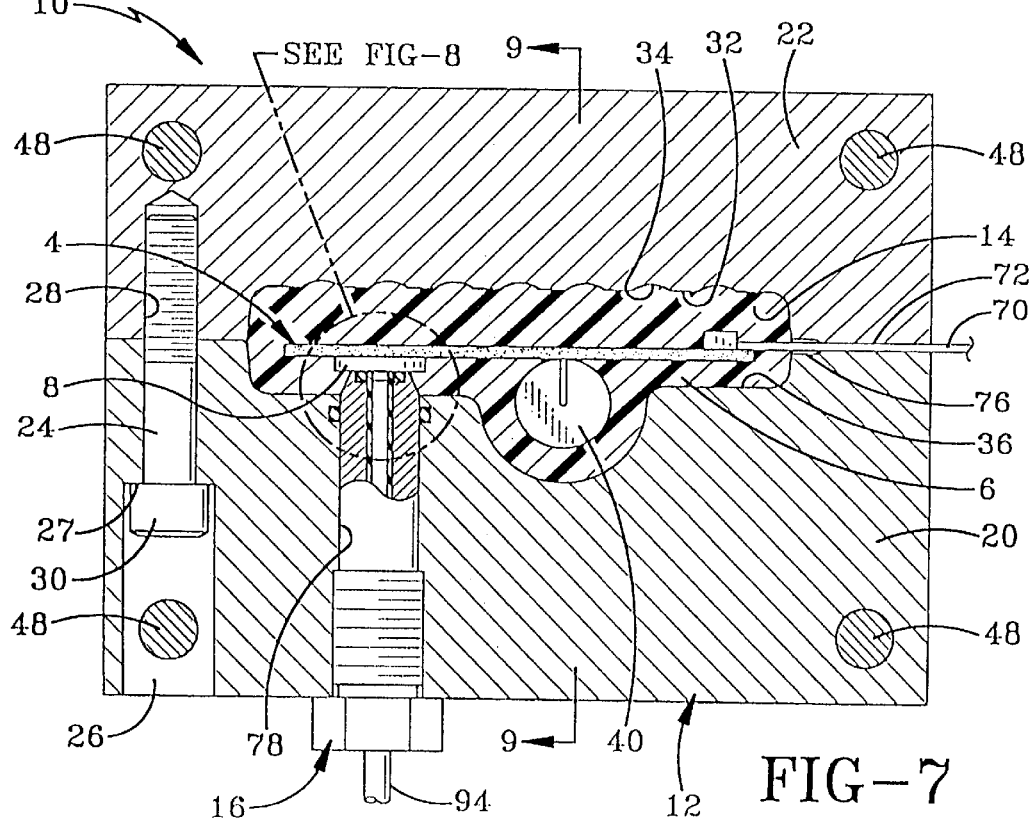
FIG. 7 is a view similar to FIG. 5 with the encapsulation chamber filled with an encapsulation material.
Figure 8:
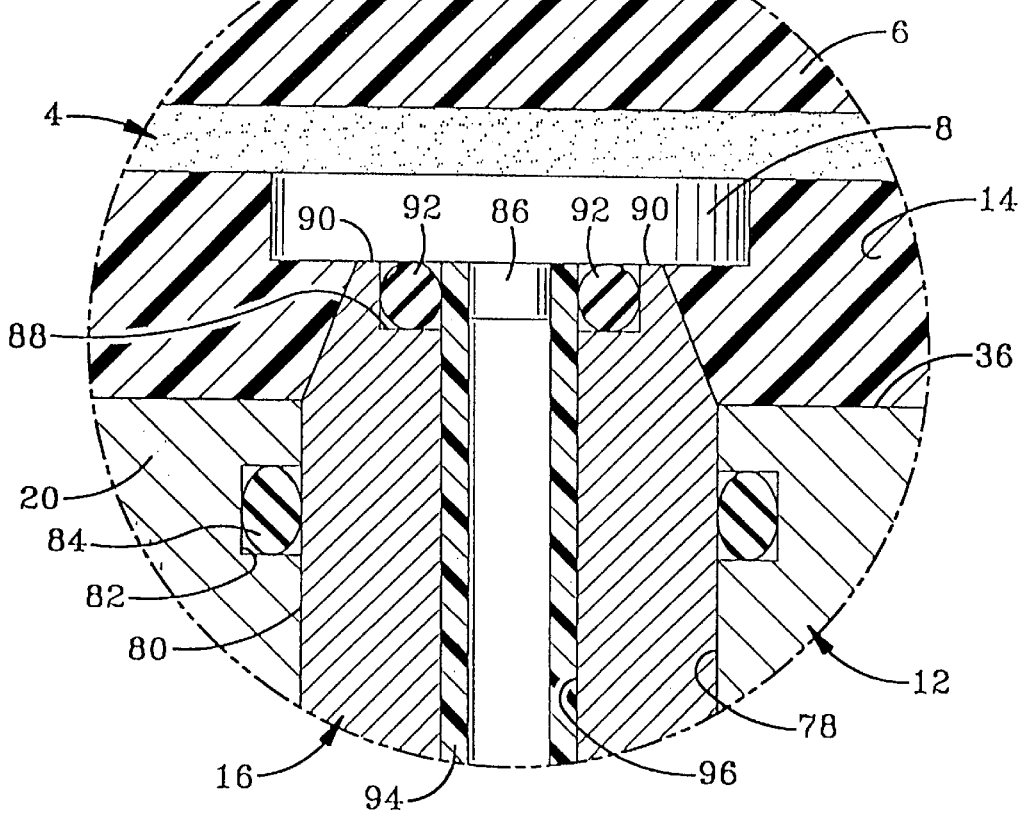
FIG. 8 is an enlarged view of the portion encircled by the circle labeled with FIG. 8 in FIG. 7.

Surfaces 32 and 36 are configured to be spaced from each element of monitoring device 4 when antenna 70 is received in channel 72 formed when halves 20 and 22 are connected. As may be seen in FIGS. 4 and 5, a generous space between each surface of body 12 and monitoring device 4 is provided when monitoring device 4 is held in the floating disposition by the clamping of antenna 70. In accordance with another objective of the present invention, damming element 16 also helps hold the floating disposition of monitoring device 4 by supporting the end of monitoring device 4 opposite antenna 70.

Damming element 16 is adjustably carried by body 12 so that the position of damming element 16 may be quickly and easily adjusted with respect to monitoring device 4 and specifically pressure sensor 8. In the preferred embodiment of the present invention, damming element 16 is threaded and is threadably received in a threaded bore formed in body half 20. The threaded connection between damming element 16 by body half 20 allows the position of damming element 16 to be adjusted with respect to pressure sensor 8 by rotating damming element 16 with respect to body element 20.

Damming element 16 preferably is in the form of a cylinder having an outer surface 80 that snugly fits within bore 78 of first body half 20. First body half 20 includes an outer O-ring seat 82 that seats an outer O-ring 84 in a manner that forces outer O-ring 84 between outer surface 80 and first body half 20. Outer O-ring 84 thus seals encapsulation chamber 14 from bore 78.

In accordance with another objective of the present invention, damming element 16 is used to prevent pressure sensor 8 from becoming clogged with encapsulation material 6 when encapsulation chamber 14 is filled with encapsulation material 6. As such, damming element 16 is configured to engage pressure sensor 8 and surround the inlet 86 of pressure sensor 8 that must remain in fluid communication with the surrounding atmosphere to provide a measurement of the pressure of the surrounding atmosphere. Damming element 16 includes an inner O-ring seat 88 disposed radially inward of outer surface 80 to form a blocking wall 90 between inner O-ring seat and outer wall 80 of damming element 16. An inner O-ring 92 is disposed in inner O-ring seat 88 to form a seal between damming element 16 and pressure sensor 8. Inner O-ring 92 thus seals inlet 86 from encapsulation chamber 14.

Another objective of the present invention involves further sealing inlet 86 from encapsulation chamber 14 by providing a breathing tube 94 that is disposed in a longitudinal passageway 96 in the center of damming element 16. Breathing tube 94 snugly fits over inlet 86 to further seal inlet 86 from encapsulation chamber 14. Inner O-ring 92 is sandwiched between breathing tube 94, pressure sensor 8, and damming element 16 to form a tight seal between breathing tube 94 and encapsulation chamber 14 that prevents encapsulation material 6 from coming into contact with inlet 86. Breathing tube 94 may extend entirely out of longitudinal passageway 96 or may stop short of the end of damming element 16. In other embodiments of the present invention, breathing tube 94 may only have a hollow portion at its tip where it fits over inlet 86 of pressure sensor 8. The remaining portion of breathing tube 94 may be solid.

Encapsulating device 10 is used by first clamping monitoring device 4 between body halves 20 and 22 by clamping antenna 70 in channel 72. Connectors 24 are inserted to hold body halves 20 and 22 together. Breathing tube 94 and damming element 16 may then be inserted into body half 20 and adjusted to contact pressure sensor 8 such that inlet 86 of pressure sensor 8 is sealed from encapsulation chamber 14. Once damming element 16 is properly adjusted and connected to pressure sensor 8, monitoring device 4 is held in a floating disposition within encapsulation chamber 14. Top plate 42 and bottom plate 44 may then be connected to the remaining elements to close the bottom of encapsulation chamber 14 and provide lip 64. After body 12 has been assembled, encapsulation material 6 may be poured into encapsulation chamber 14 through opening 60 in top plate 42. The insertion of encapsulation material 6 is stopped when it reaches the level of lip 64. Encapsulation material 6 is allowed to set up or cure before disassembling body 12 and removing encapsulated monitoring device 2 from encapsulating device 10. Damming element 16 ensures that pressure sensor 8 remains in fluid communication with the surrounding atmosphere once monitoring device 4 has been encapsulated as depicted in FIG. 1.

Accordingly, the improved encapsulation device is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the encapsulation device is constructed and used, the characteristics of the construction, and the advantageous new and useful results obtained; the new and useful structures, devices, elements, arrangements, parts, and combinations are set forth in the appended claims.

What is claimed is:

1. A device for encapsulating a monitoring device for a pneumatic tire with an encapsulation material, the monitoring device having at least a pressure sensor, the device for encapsulating comprising:
    an encapsulation body having an encapsulation chamber; and
    a damming element carried by said encapsulation body, said damming element being adapted to prevent the encapsulation material from clogging the pressure sensor.

2. The device of claim 1, wherein the encapsulation body includes a first body half and a second body half, said body halves cooperating to define said encapsulation chamber when said body halves are connected to each other.

3. The device of claim 2, wherein one of said body halves includes a textured surface that forms at least a part of said encapsulation chamber when said body halves are connected.

4. The device of claim 2, wherein the encapsulation body further includes a top plate and a bottom plate, said plates being connected to said body halves to further define said encapsulation chamber.

5. The device of claim 4, wherein said top plate has an opening defining an edge, said edge of said opening forming a lip over at least a portion of said encapsulation chamber when said top plate is connected to said body halves.

6. The device of claim 2, wherein at least one of said body halves includes a channel that is adapted to receive at least a portion of the monitoring device to at least partially hold the monitoring device in a floating disposition within said encapsulation chamber.

7. The device of claim 6, wherein both of said body halves include a partial channel portion, said partial channel portions cooperating to form said channel when said body halves are connected to form said encapsulation chamber.

8. The device of claim 1, wherein said damming element is adjustably carried by said encapsulation body such that the position of said damming element with respect to said encapsulation body may be adjusted.

9. The device of claim 8, wherein said damming element is threadably carried by said encapsulation body such that rotation of said damming element adjusts the position of said damming element with respect to said encapsulation body.

10. The device of claim 1, further comprising an outer O-ring disposed between said damming element and said encapsulation body.

11. The device of claim 10, further comprising an inner O-ring seat formed in said damming element, an inner O-ring disposed in said seat, said inner O-ring adapted to engage the pressure sensor on the monitoring device when the monitoring device is disposed in said encapsulation chamber.

12. The device of claim 1, wherein said damming element is a tube having a longitudinal passageway.

13. The device of claim 12, further comprising a breathing tube disposed in said longitudinal passageway, said breathing tube adapted to engage the pressure sensor when the monitoring device is disposed in said encapsulation chamber.

14. The device of claim 13, further comprising an inner O-ring disposed between said breathing tube and said damming element, said inner O-ring adapted to engage the pressure sensor when the monitoring device is in the encapsulation chamber.

15. The device of claim 14, wherein the damming element includes an inner O-ring seat and an outer wall, said inner O-ring seat being disposed adjacent said longitudinal passageway and radially inward of said outer wall.

16. The device of claim 15, wherein said encapsulation body having an outer O-ring seat, an outer O-ring disposed in said outer O-ring seat, said outer O-ring contacting said outer wall of said damming element to at least partially seal said encapsulation chamber.

17. A device for encapsulating a monitoring device for a pneumatic tire with an encapsulation material, the monitoring device having at least a pressure sensor, the device for encapsulating comprising:
    an encapsulation body defining an encapsulation chamber; and
    damming means carried by said encapsulation body for preventing the encapsulation material from clogging the pressure sensor when encapsulation material is placed into the encapsulation chamber to encapsulate the monitoring device.

* * * * *